United States Patent [19]

Ohta et al.

[11] Patent Number: 4,719,137

[45] Date of Patent: Jan. 12, 1988

[54] MAGNETO-OPTIC MEMORY ELEMENT

[75] Inventors: Kenji Ohta, Yao; Akira Takahashi; Hiroyuki Katayama, both of Nara; Junji Hirogane, Tenri; Yoshiteru Murakami, Nishinomiya, all of Japan

[73] Assignee: Sharp Kabushiki Kaisha, Osaka, Japan

[21] Appl. No.: 721,707

[22] Filed: Apr. 10, 1985

[30] Foreign Application Priority Data

Apr. 13, 1984 [JP] Japan .................. 59-75541
May 22, 1984 [JP] Japan ................. 59-104207

[51] Int. Cl.⁴ .............................. G11B 7/24
[52] U.S. Cl. ...................... 428/67; 428/66; 428/457; 428/694; 428/900; 430/945
[58] Field of Search ............ 428/694, 64, 900, 66, 428/457, 67; 365/122; 360/131, 135; 430/945

[56] References Cited

U.S. PATENT DOCUMENTS

| | | | |
|---|---|---|---|
| 4,020,278 | 4/1977 | Carré et al. | 358/128 |
| 4,390,600 | 6/1983 | Ohta et al. | 428/621 |
| 4,414,650 | 11/1983 | Ohta et al. | 365/122 |
| 4,435,801 | 3/1984 | Levin | 369/275 |
| 4,467,383 | 8/1984 | Ohta et al. | 360/131 |
| 4,489,139 | 12/1984 | Ohta et al. | 428/621 |
| 4,543,307 | 9/1985 | Drexler et al. | 430/945 |
| 4,544,443 | 10/1985 | Ohta et al. | 156/643 |
| 4,546,464 | 10/1985 | Inoue et al. | 427/240 |
| 4,610,912 | 9/1986 | Takahashi et al. | 428/213 |
| 4,634,617 | 1/1987 | Ohta et al. | 428/65 |

FOREIGN PATENT DOCUMENTS 63439 10/1982 European Pat. Off. .
27495 2/1982 Japan .
93770 12/1982 Japan .

OTHER PUBLICATIONS

Mansuripur et al., "Optimum Disk Structures", IEEE Transactions on Magnetics, vol. MAG-18, No. 6, Nov. 1982, p. 1241.

Primary Examiner—George F. Lesmes
Assistant Examiner—William M. Atkinson
Attorney, Agent, or Firm—Birch, Stewart, Kolasch & Birch

[57] ABSTRACT

A magneto-optic memory element includes a GdTbFe recording layer sandwiched between a pair of transparent AlN dielectric layers. At least one of the pair of transparent AlN dielectric layers is extended to have a size larger than the GdTbFe recording layer so as to cover the peripheral edge of the GdTbFe recording layer, thereby protecting the GdTbFe recording layer from oxygen and moisture. An Al-Ni alloy reflection film is formed on one of the pair of transparent AlN dielectric layers in order to increase the apparent Kerr rotation angle produced by the magneto-optic memory element.

8 Claims, 4 Drawing Figures

MAGNETO-OPTIC MEMORY ELEMENT

BACKGROUND OF THE INVENTION

1. Field of the Invention

The present invention relates to a magneto-optic memory element on which a laser beam is impinged to record, read out or erase information onto or from the magneto-optic memory element.

2. Description of the Priod Art

Recently, a magneto-optic memory element has been developed, which is used in an optical memory disc storing alterable information. The most effective magneto-optic memory element includes a recording medium made of an amorphous alloy thin-film consisting of rare earth metal and transition metal. Such a magneto-optic memory element is generally stable because the recording bit is not affected by the grain boundary, and a large size recording medium can be easily formed.

The enginering group including the present invention has discovered that the recording medium deteriorates when exposed to oxygen or moisture. In order to protect the recording medium from oxygen and moisture, a magneto-optic memory element has been proposed wherein the amorphous alloy thin-film recording layer is sandwiched between a pair of transparent dielectric layers. A basic structure of the improved magneto-optic memory element is disclosed is copending U.S. patent application Ser. No. 489,889, "Magneto-Optic Memory Device", filed on Apr. 29, 1983 by Kenji Ohta, Akira Takahashi, Hiroyuki Katayama, Junji Hirokane and Hideyoshi Yamaoka, and assigned to the same assignee as the present application. The corresponding European Patent Application was published on June 27, 1984 bearing the publication number 0 111 988 A1. The corresponding Canadian Patent Application is Ser. No. 427,088 filed on Apr. 29, 1983.

The magneto-optic memory element disclosed in the above-mentioned U.S. patent application is useful because the transparent dielectric layers function to effectively combine the Kerr effect and the Faraday effect so as to increase the Kerr rotation angle. However, in the magneto-optic memory element disclosed in the aforesaid U.S. patent application, there is a possibility that the amorphous alloy thin-film recording layer may be damaged due to oxidation caused by the SiO or SiO$_2$ dielectric layer. In order to further improve the magneto-optic memory element, the present inventors have proposed a magneto-optic memory element wherein an amorphous alloy thin-film recording layer is sandwiched between a pair of transparent nitride films. A typical structure of this magneto-optic memory element is disclosed in copending U.S. patent application Ser. No. 648,741, "Magneto-Optic Memory Element", filed on Sept. 10, 1984 by Akira TAKAHASHI, Yoshiteru Murakami, Junji Hirokane, Hiroyuki Katayama, Kenji Ohta and Hideyoshi Yamaoka, and assigned to the same assignee as the present application. The corresponding European Patent Application was filed on Sept. 17, 1984 and assigned Application No. 84306341.3. The corresponding Canadian Patent Application is Ser. No. 462,506 fled on Sept. 5, 1984.

The nitride films effectively protect the amorphous alloy thin-film recording layer from oxygen and moisture at the center portion thereof. However, the periphery of the element includes a bare recording layer. Thus, there is a possibility that the amorphous alloy thin-film recording layer may deteriorate from the periphery thereof in the magneto-optic memory element disclosed in U.S. patent application Ser. No. 648,741. Furthermore, in U.S. patent application Ser. No. 648,741, an Al reflection layer is provided so as to enhance the S/N ratio in the reproduced signal by increasing the photoelectric-magnetic effects (combined Kerr effect and Faraday effect). However, there is a possibility that the turbidity is formed in the Al reflection film during the formation of the Al reflection film. The turbidity reduces the reflection factor.

OBJECTS OF SUMMARY OF THE INVENTION

Objects of the Invention

Accordingly, an object of the present invention is to provide a magneto-optic memory element which ensures a stable operation.

Another object of the present invention is to provide a magneto-optic memory element, wherein an amorphous alloy thin-film recording layer is protected from oxygen and moisture.

Still another object of the present invention is to provide a pure reflection film in a magneto-optic memory element of the reflection type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, an amorphous alloy thin-film recording layer is sandwiched between a pair of transparent dielectric layers which are moisture-proof and oxygen-proof layers. The periphery of at least one of the transparent dielectric layers is extended so that the transparent dielectric layer has a size larger than the amorphous alloy thin-film recording layer, thereby covering the periphery edge of the amorphous alloy thin-film recording layer. In a preferred form, a reflection film is formed on one of the transparent dielectric layers. The reflection film is made of an Al-Ni alloy film formed by a sputtering method. The Al-Ni alloy reflection film is free of impurities, and ensures a high reflection factor.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
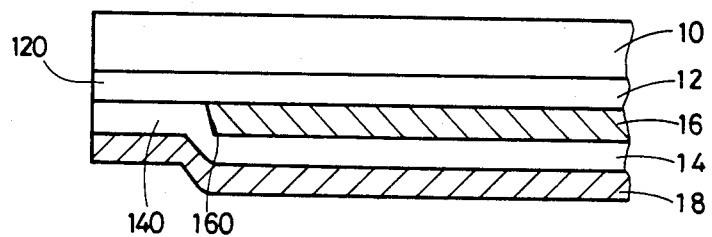
FIG. 1 is a sectional view of an essential part of an embodiment of a magneto-optic memory element of the present invention.

A magneto-optic memory element of the present invention includes a transparent substrate 10, and a pair of transparent dielectric layers 12 and 14. Each of the transparent dielectric layers is a moisture-proof and oxygen-proof film such as an AlN film or a Si3N4 film. An amorphous alloy thin-film recording layer 16, for example, an alloy film of a rare earth metal and a transition metal, is sandwiched between the pair of transparent dielectric layers 12 and 14. A reflection film 18 is formed on the transparent dielectric layer 14, the transparent dielectric layer 14 and the reflection film 18 functioning, in combination, to enhance the photoelectric-magnetic effects (combined Kerr effect and Faraday effect). The peripheries of the pair of transparent dielectric layers 12 and 14 are extended so that the transparent dielectric layers 12 and 14 are longer than the amorphous alloy thin-film recording layer 16. That is, the periphery of the amorphous alloy thin-film recording layer 16 is sealed by the pair of transparent dielectric layers 12 and 14. More specifically, peripheries 120 and 140 of the transparent dielectric layers 12 and 14 function, in combination, to protect a periphery 160 of the amorphous alloy thin-film recording layer 16 from moisture and oxygen. If both transparent dielectric layers 12 and 14 are formed by the same material such as a nitride film, the boundary is tightly fixed by the pair of transparent dielectric layers 12 and 14 at the peripheries thereof.

The structure of the magneto-optic memory element of the present invention is applicable to an element of which the transparent substrate 10 is made of either a glass substrate or a moisture permeable resin substrate such as an acrylic resin substrate or a polycarbonate substrate.

The magneto-optic memory element of the above-mentioned structure shows a stable operation, and the element, even at the periphery thereof, was not damaged after a high temperature and high humidity test carried out in conditions of 60° C., and 95% humidity.

Figure 2:
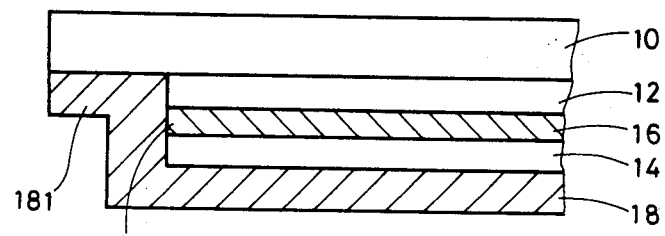
FIG. 2 is a sectional view of an essential part of another embodiment of a magneto-optic memory element of the present invention.

FIG. 2 shows another embodiment of the magneto-optic memory element of the present invention. Like elements corresponding to those of FIG. 1 are indicated by like numerals.

The transparent substrate 10 has a size larger than the pair of transparent dielectric layers 12 and 14, preferably made of a pair of AlN films, and the amorphous alloy thin-film recording layer 16, preferably made of a thin-film alloy of a rare earth element and a transition metal such as GdNdFe, TbFe or TbFeCo. The moisture-proof and oxygen-proof reflection film 18 such as an Al film, Ni film, Cr film or a stainless steel film, is disposed on the transparent dielectric film 14 so that the reflection film 18 is extended (181) to cover the periphery 160 of the amorphous alloy thin-film recording layer 16. The reflection film 18 fixed to the transparent substrate 10 at the periphery 181 thereof.

Figure 3:
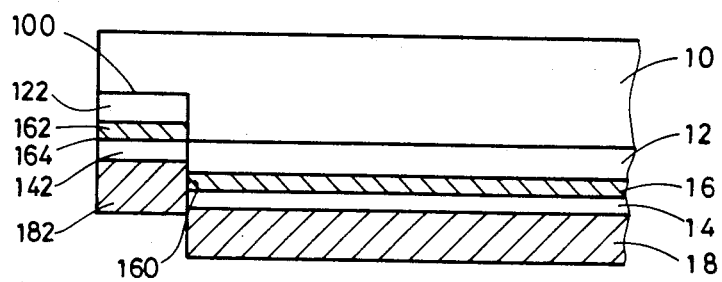
FIG. 3 is a schematic sectional view of an essential part of still aother embodiment of a magneto-optic memory element of the present invention.

FIG. 3 shows still another embodiment of the magneto-optic memory element of the present invention. Like elements corresponding to those of FIG. 1 are indicated by like numerals.

The transparent substrate 10 is provided with a cut-away portion 100 at the periphery thereof. The cut-away portion 100 has a depth of about 120 nm. The transparent dielectric layer 12 (and 122), which does not contain oxygen, and is preferably an AlN film, is formed on the transparent substrate 10 (and 100) to have a thickness of about 100 nm. Then the amorphous alloy thin-film recording layer 16 (and 162), preferably a GdTbFe film, is formed on the transparent dielectric layer 12 (and 122) to have a thickness of about 20 nm. The transparent dielectric layer 14 (and 142), which does not include oxygen, and is preferably an AlN film, is formed on the amorphous alloy thin-film recording layer 16 (and 162) to have a thickness of about 50 nm. Then, the reflection film 18 (and 182) is formed on the transparent dielectric layer 14 (and 142) to have a thickness of about 150 nm. The periphery of each layer (122, 162, 142 and 182) follows the cut-away portion 100. The edge 164 of the amorphous alloy thin-film recording layer 162 may be damaged by the atmosphere. However, the edge 160 of the amorphous alloy thin-film recording layer 16 is protected by the reflection film 182. If the periphery portion 162 is not used as the actual recording area, the magneto-optic memory element of FIG. 3 ensures a stable operation.

Figure 4:
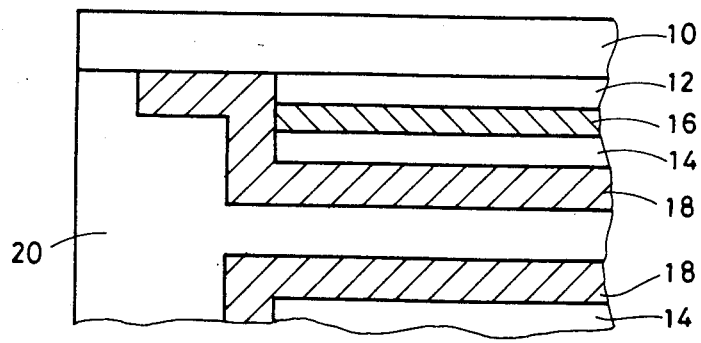
FIG. 4 is a sectional view of an essential part of a further embodiment of a magneto-optic memory element of the present invention.

FIG. 4 shows a further embodiment of the magneto-optic memory element of the present invention. Like elements corresponding to those of FIG. 1 are indicated by like numerals.

Two magneto-optic elements, each having the similar structure as the element shown in FIG. 2, are fixed to each other through the use of an adhesive 20 such as a photopolymer, in a manner that the transparent substrates 10 face the atmosphere, and the reflection films 18 confront each other.

As already discussed in the copending U.S. patent application Ser. No. 648,741, the reflection film 18 must have a high index of reflection to obtain the large apparent Kerr rotation angle. Normally, the magneto-optic memory element is formed by the sputtering method. Since aluminum is stable and is commercially available, aluminum film is most widely used as the reflection film in the magneto-optic memory element. However, there is a possibility that the turbidity is formed in the Al reflection film during its formation in the conventional element. The present inventors have discovered that a clean Al reflection film is obtained under a predetermined manufacturing condition or when the material of the reflection film is properly selected. Following is a preferred example wherein a clean reflection film is formed.

The transparent substrate 10 is either a glass substrate, a polycarbonate substrate, or an acrylic resin substrate. The transparent dielectric layer 12 is preferably a transparent AlN film having a thickness of about 100 nm. The amorphous alloy thin-film recording layer 16 is a GdTbFe film having a thickness of about 27 nm. The second transparent dielectric layer 14 is an AlN film having a thickness of about 35 nm. The reflection film 18 is an alloy film including aluminum (Al) and nickel (Ni). The Al-Ni alloy film is formed by sputtering a target of aluminum (Al) to which nickel (Ni) is added. The Al-Ni reflection film preferably has a thickness greater than 60 nm.

The Al-Ni reflection film 18 does not include turbidity even though the reflection film 18 is formed on the AlN dielectric layer 14. The Al-Ni reflection film 18 is oxygen-proof and water-proof and, therefore, the Al-Ni reflection film is suited for ensuring a stable operation of the magneto-optic memory element. Of course, the index of reflection is high enough to produce a large apparent Kerr rotation angle. A preferred reflection film can be formed by the sputtering method with the target of aluminum (Al) to which either nickel (Ni), palladium (Pd) or platinum (Pt) is added.

The invention being thus described, it will be obvious that the same may be varied in many ways without departure from the spirit and scope of the invention, which is limited only by the following claims.

What is claimed is:

1. A magneto-optic memory element comprising:
   a transparent substrate;
   a first transparent oxygen-proof, moisture-proof dielectric layer formed on said transparent substrate;
   an alloy thin-film magneto-optic recording layer formed on said transparent oxygen-proof, moisture-proof dielectric layer;
   a second transparent oxygen-proof, moisture-proof dielectric layer formed on said alloy thin-film magneto-optic recording layer;
   a reflection layer formed on said second transparent oxygen-proof, moisture-proof dielectric layer; and
   said reflection layer including an extended portion making said reflection layer larger than said magneto-optic recording layer, said extended portion being disposed over the peripheral edge of said magneto-optic recording layer so as to protect said peripheral edge from oxidation and moisture.

2. The magneto-optic memory element of claim 1, wherein said reflection layer is an aluminum (Al) reflection layer including an element which prevents the formation of turbidity in the aluminum (Al) reflection layer.

3. The magneto-optic memory element of claim 1, wherein said reflection layer is an Al-Ni alloy film.

4. The magneto-optic memory element of claim 3, wherein said Al-Ni alloy film is formed by a sputtering method with a target of aluminum (Al) to which nickel (Ni) is added.

5. A magneto-optic memory element comprising:
   a transparent substrate;
   a first transparent oxygen-proof, moisture-proof dielectric layer formed on said transparent substrate;
   an alloy thin-film magneto-optic recording layer formed on said transparent oxygen-proof, moisture-proof dielectric layer;
   a second transparent oxygen-proof, moisture-proof dielectric layer formed on said alloy thin-film magneto-optic recording layer;
   a reflection layer formed on said second transparent oxygen-proof, moisture-proof dielectric layer; and
   said transparent substrate having a cutaway portion at a periphery thereof, portions of said first dielectric layer, said magneto-optic recording layer, said second dielectric layer, and a portion of said reflection layer at said periphery being displaced by the depth of said cutaway portion, the displaced portion of said reflection layer covering the peripheral edge of the non-displaced magneto-optic recording layer so as to protect said periphera ledge from oxidation and moisture.

6. The magneto-optic memory element of claim 5 wherein said reflection layer is an aluminum (Al) reflection layer including an element which prevents the formation of turbidity in the aluminum (Al) reflection layer.

7. The magneto-optic memory element of claim 5 wherein said reflection layer is an Al-Ni alloy film.

8. The magneto-optic memory element of claim 7, wherein said Al-Ni alloy film is formed by a sputtering method with a target of aluminum (Al) to which nickel (Ni) is added.

* * * * *